(12) United States Patent
Santos

(10) Patent No.: US 7,107,521 B2
(45) Date of Patent: Sep. 12, 2006

(54) XSL DYNAMIC INHERITANCE

(75) Inventor: Julio Santos, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 09/898,138

(22) Filed: Jul. 3, 2001

(65) Prior Publication Data

US 2004/0205551 A1 Oct. 14, 2004

(51) Int. Cl.
*G06N 3/00* (2006.01)

(52) U.S. Cl. ........................ 715/513; 715/517

(58) Field of Classification Search ............... 715/513, 715/531, 500, 523, 517, 530
See application file for complete search history.

(56) References Cited

U.S. PATENT DOCUMENTS

| | | | | |
|---|---|---|---|---|
| 6,006,242 A | * | 12/1999 | Poole et al. | 715/531 |
| 6,101,513 A | * | 8/2000 | Shakib et al. | 715/527 |
| 6,148,311 A | * | 11/2000 | Wishnie et al. | 715/513 |
| 6,249,794 B1 | * | 6/2001 | Raman | 715/500 |
| 6,263,332 B1 | * | 7/2001 | Nasr et al. | 707/5 |
| 6,336,124 B1 | * | 1/2002 | Alam et al. | 715/523 |
| 6,438,540 B1 | * | 8/2002 | Nasr et al. | 707/3 |
| 6,463,440 B1 | * | 10/2002 | Hind et al. | 707/102 |
| 6,487,566 B1 | * | 11/2002 | Sundaresan | 715/513 |
| 6,507,857 B1 | * | 1/2003 | Yalcinalp | 715/513 |
| 6,519,617 B1 | * | 2/2003 | Wanderski et al. | 715/513 |
| 6,732,109 B1 | * | 5/2004 | Lindberg et al. | 707/101 |

OTHER PUBLICATIONS

Adler et al., "Extensible Stylesheet Language (XSL) Version 1.0," Mar. 27, 2000, W3C.*
Mazzochi, Stefano, "eXtensible Server Pages (XSP) Layer 1," 1999, <http://xml.coverpages.org/WD-xsp-19990611.html>, pp. 1-9.*
Holland, R., "XML Schema Catches Heat," *eWEEK*, Apr. 23, 2001, http://dailynews.yahoo.com/h/zd/20010423.
"The Apache-XML Project" [online], last published Jul. 3, 2003 [retrieved on Jul. 16, 2003]. Retrieved from the Internet: <URL: http://xml.apache.org>.
Clark, James, "XP-an XML Parser in Java, Version .5" [online], 1998 [retrieved on Jul. 16, 2003]. Retrieved from the Internet: <URL: http://www.jclark.com/xml/xp>.
Clark, Chris, "RealWorld ASP.net informative informal training, Basic XML3:XSL" [online], 2001 [retrieved Jul. 16, 2003]. Retrieved from the Internet: <URL: http://www.aspalliance.com/chrisg/default.asp?article=86>.
XSL Transformations (XSLT), Version 1.0, W3C Recommendation Nov. 16, 1999, [online] Nov. 16, 1999, [retrieved on Dec. 3, 2004], Retrieved from the Internet: <URL: http://www.w3.org/TR/1999/REC-xslt-19991116>.
Michael Kay, "XSLT Programmer's Reference," © 2000 Wrox Press, Latest Reprint Jun. 2000, pp. 207-223.
"AlphaBlox SpreadsheetBlox, Turning Reports into Personalized, Interactive Applications," © 2000 AlphaBlox Corporation, SPREADSHEET-DS-0900.
"Inside the Analysis Suite, A Technical Architecture Overview of AlphaBlox Analysis Suite," An AlphaBlox Technical White Paper, © 1999.

* cited by examiner

*Primary Examiner*—Stephen Hong
*Assistant Examiner*—Kyle Stork

(57) ABSTRACT

A system, method, and a computer program product for dynamically generating rules for XSL transformations by operating on an XML/XSL DOM representing a tree structure of an XML document in memory. User generated properties are received and transformed into XML/XSL nodes in memory. XML/XSL DOM is modified with the transformed XML/XSL nodes containing XSL rules of transformation with a variable dynamically generated by the user. The modified XML/XSL DOM is processed to generate a document in a specified format. Newly generated dynamic XSL rules override imported rules in the XML/XSL DOM.

41 Claims, 8 Drawing Sheets

XSL DYNAMIC INHERITANCE

BACKGROUND

1. Technical Field

The present invention generally relates to extensible markup language (XML) and extensible stylesheet language transformations (XSLT), and more specifically to a method and system for dynamically generating rules for XML transformations.

2. Background of the Invention

Extensible Markup Language (XML) describes a class of data objects called XML documents. XML documents can be read and manipulated using an XML Document Object Model (DOM), which represents a tree view of the XML document in memory. Unlike Hypertext Markup Language (HTML) in which the meaning of pre-defined tags is well understood by a browser, XML has no standard way of displaying XML documents. Extended Stylesheets Language (XSL) is a mechanism describing the rules by which an XML document can be transformed into another markup language like HTML and eventually be displayed by a browser.

An XSL document allows an XML web designer to include other XSL files. Typically, the web designer can create only a limited number of XSLT rules (or stylesheets). Therefore, there is a limited number of ways an XML document can be transformed. To extend the list of available rules, the web designer would have to create new rules and hardcode them into the XSL file. If, for example, a user would like to experiment with all page sizes or all background colors in his document, he might not have enough existing rules to cover all possible combinations of page sizes and colors. Some users might be able to create their own XSL rules. However, often users are not computer savvy and are not sure how to manipulate existing rules and they might not have access to a server where the rules are stored.

Therefore, what is needed is a way for a user to specify any possible display of parameters for a particular XML document.

SUMMARY OF THE INVENTION

The present invention is a system, method, and computer program product for dynamically generating rules for XML transformations according to a user input. User generated properties are received in the form of a series of key-value pairs and transformed into XML/XLS nodes, each node representing an XSL rule of transformation of XML data. New nodes are added to an XML/XSL DOM. Nodes in the XML/XSL DOM represent a tree structure. Each node in the tree structure is an XML tag, either representing inline XSL rules or XSL instructions for including or importing other XSL rules. This set of rules describes how XML data should be transformed. The XML/XSL DOM is modified with the new added rules so that dynamically generated rules override the imported ones. Modified XML/XSL DOM is processed to generate a document in a specified format. The described embodiment uses a known concept of importing rules so that imported default rules have a lower priority than the dynamically generated and added on the fly rules.

DETAILED DESCRIPTION OF PREFERRED EMBODIMENTS

Figure 1:
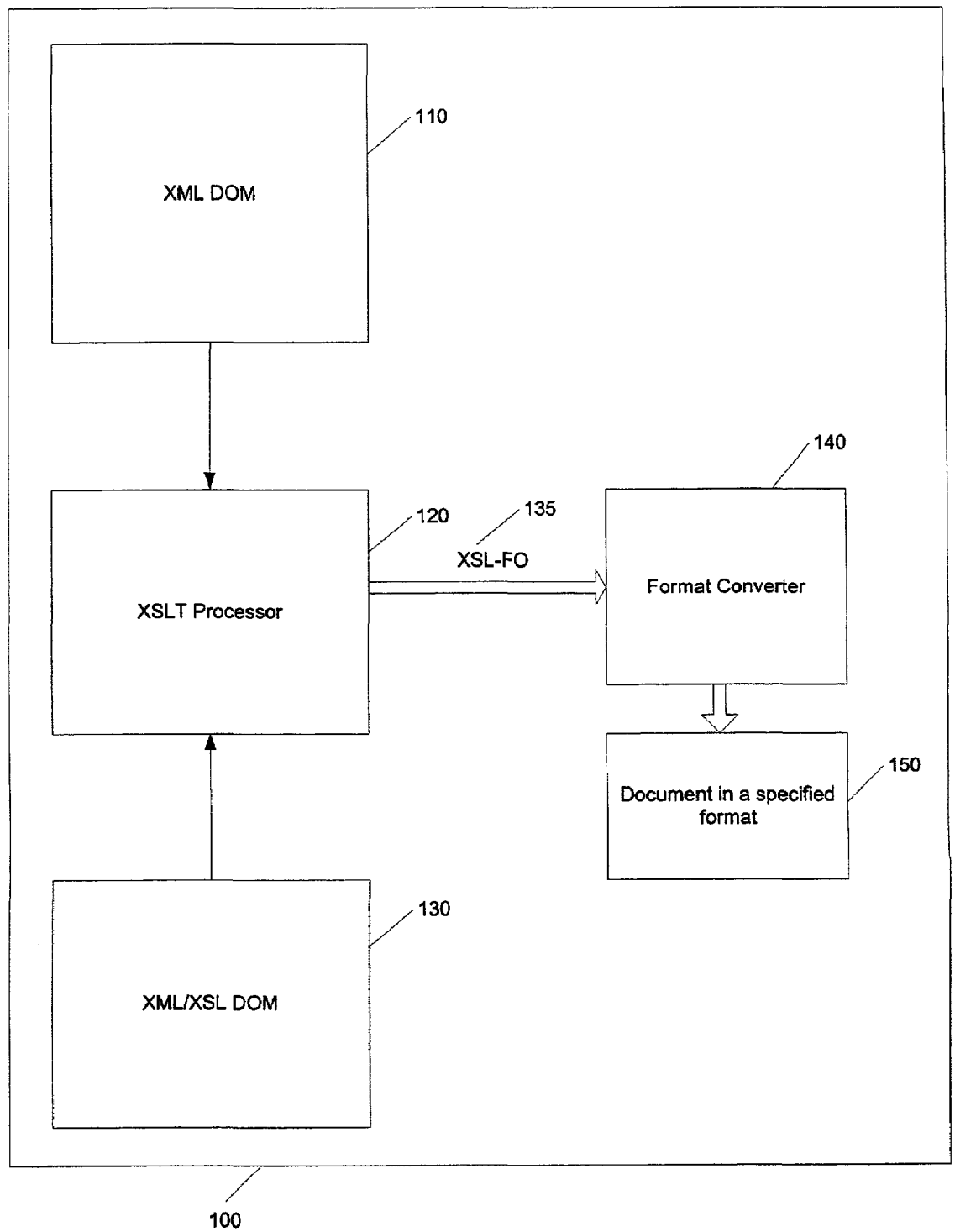
FIG. 1 is a block diagram of one embodiment of a conventional system for XML transformation.

FIG. 1 illustrates a block diagram of a conventional system 100 for XML transformation. System 100 includes an XML DOM 110, an XSLT processor 120, XML/XSL DOM 130, XSL FO 135, Format Converter 140, and document 150 in a specified format.

XML DOM 110 represents a tree view of the parsed XML document in memory. XML/XSL DOM 130 represents a tree view of a parsed XSL file (not shown) in memory. XSL file is described below in connection with FIG. 3. XSLT processor 120 reads XML DOM 110 and XML/XSL DOM 130, applies XML/XSL DOM 130 to XML DOM 110, and generates XSL FO 135. XSL FO format represents documents in XSL form. XSLT processors 120 can be one of Apache Xalan, Saxon, Microsoft MSXML, James Clark XT, or any other appropriate translator. Format Converter 140 converts XSL FO 135 into a document in a specified format 150, such as PDF.

Figure 2:
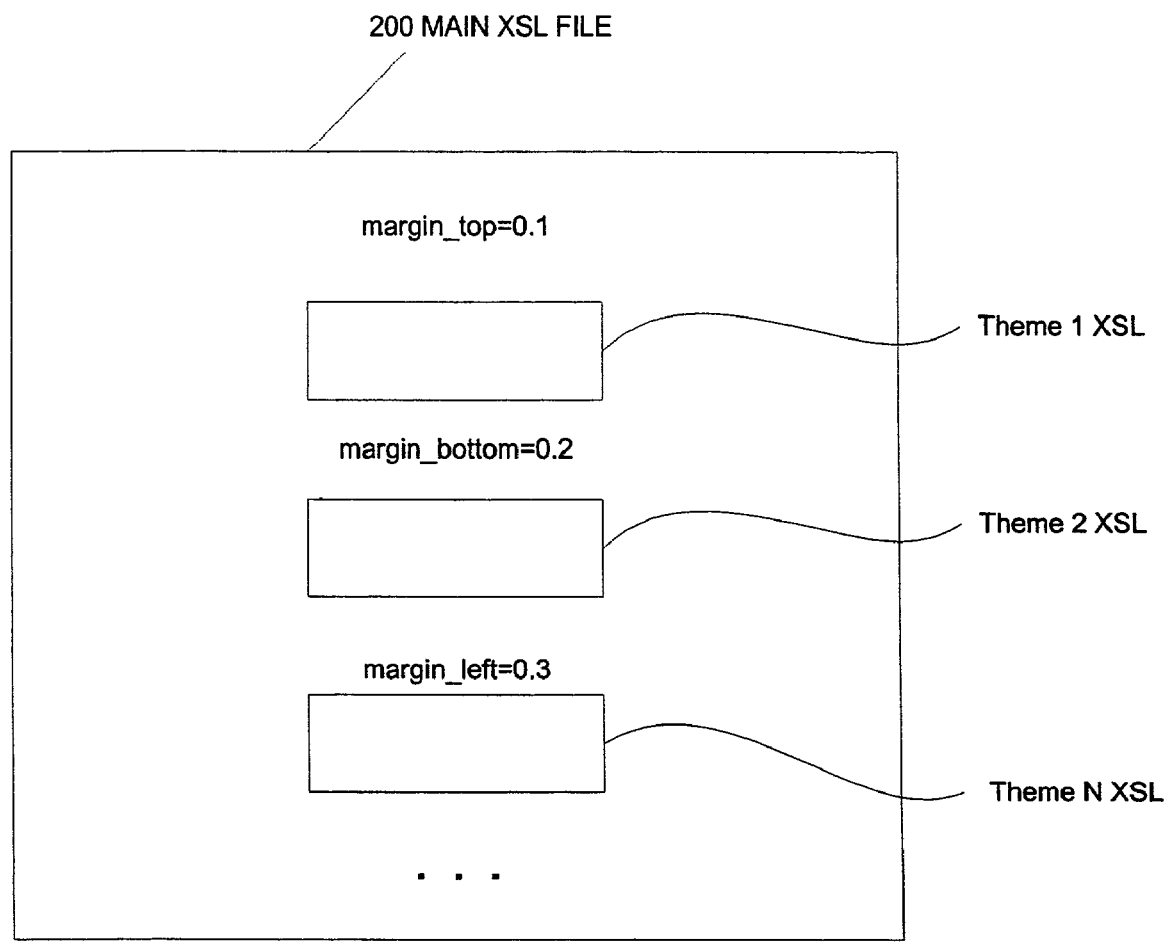
FIG. 2 illustrates an XSL file in accordance with an embodiment of the present invention.

FIG. 2 illustrates an XSL file 200 that includes other XSL files. One included XSL file describes the rules by which an XML document should be transformed. XSL file 200 includes the following variables/properties: 'margin_top'=0.1 inches, 'margin_bottom'=0.2 inches, and 'margin_left'=0.3 inches. These files can be included using the XSL tag: <xsl:include> or imported using <xsl:import>. The <xsl:include> is a top-level element that copies the contents of the <xsl-stylesheet> element into the included document. For example, "margin_top=0.1 inches" is included into the containing XSL file 200. Included data has the same priority as data located in the containing XSL file 200.

Figure 3:
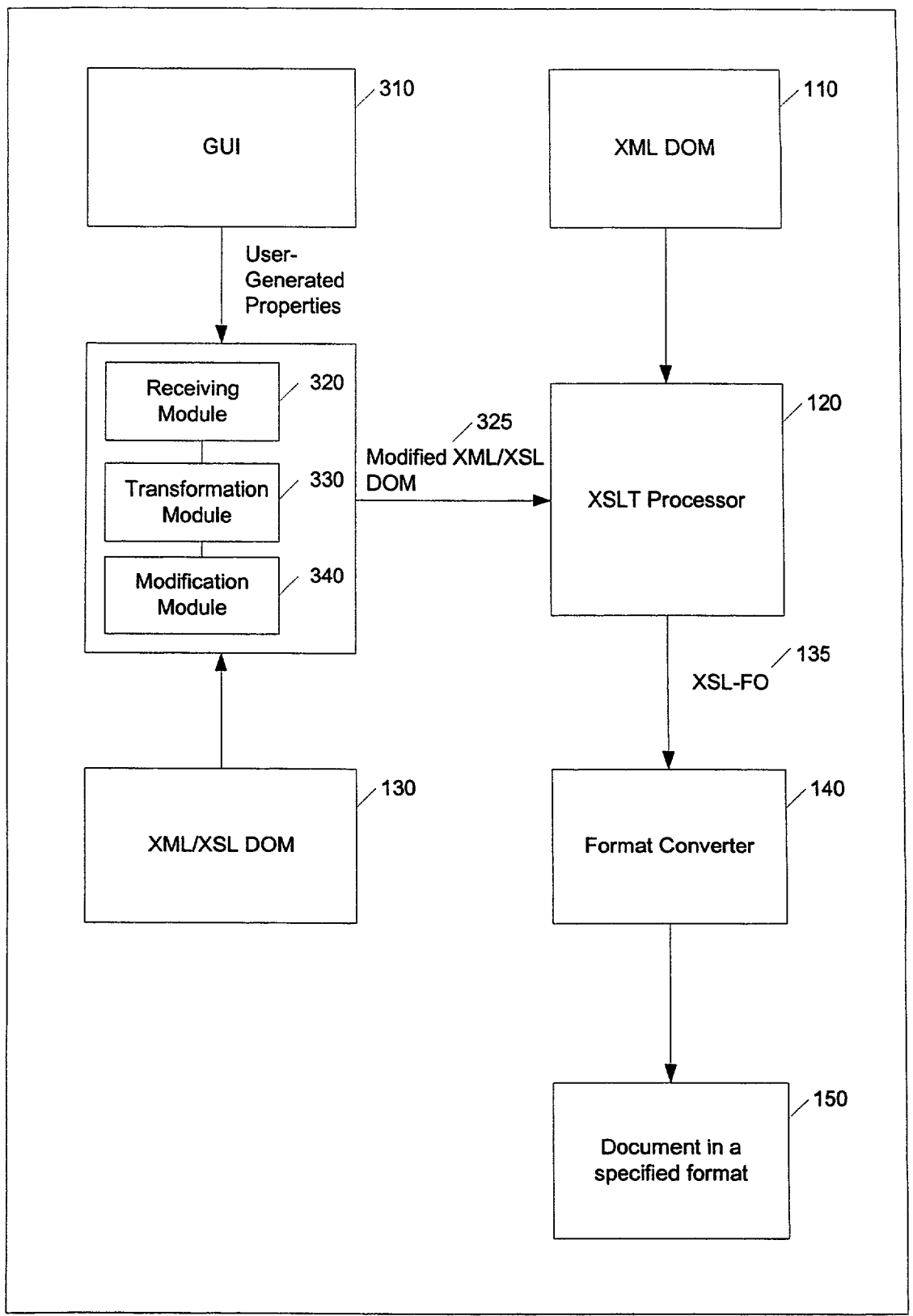
FIG. 3 is a block diagram illustrating an overall architecture of a system for XML transformation in accordance with a described embodiment of the present invention.

Referring now to FIG. 3, there is shown an illustration of architecture of System 300 for dynamically generating rules for XML transformations in accordance with a preferred embodiment of the present invention. System 300 includes, but is not limited to, an XML DOM 110, a Receiving Module 320, a Transformation Module 330, a Modification Module 340, an XML/XSL DOM 130, a modified XML/XSL DOM 325, a Graphic User Interface (GUI) 310, an XSLT processor 120, a Format Converter 140, an XSL-FO 135, and a document in a specified format 150.

GUI 310 is responsible for providing a user interface to System 300, including receiving user input queries and displaying query results. GUI 310 is discussed in more detail below in connection with FIG. 4.

XML DOM 110 is a memory representation of XML file 200 in the form of a tree. XML/XSL DOM 130 is a memory representation of XSL rules in the form of a tree. Each node in the tree is an XML tag, either representing inline XSL rules or XSL instructions for including or importing other XSL rules. This set of rules describes how XML data should be transformed. Receiving module 320 receives user-generated properties in the form of key-value pairs. Transformation module 330 is coupled to the Receiving module 320. Transformation module 330 converts the received user-generated properties to XML/XSL nodes in memory, each node is an XML tag representing dynamically generated rules. Modification module 340 is coupled to the Transformation module 330. Modification module 340 modifies the XML/XSL DOM 130 by attaching on the fly one node per dynamic variable received from GUI 310. As a result, each node in the modified XML/XSL DOM 325 has one dynamic variable. There can be any number of nodes with dynamic variables in the modified XML/XSL DOM 325.

XSLT processor 120 receives modified XML/XSL DOM 325. Because dynamically generated rules added to the containing XSL file 200 have a higher priority than imported default XSL rules, XSLT processor 120 overrides the imported rules with the dynamically generated ones and processes modified XML/XSL DOM 325 to generate XSL-FO 135. XSL FO format represents documents in an XML form. XSLT processor 120 could be one of Apache Xalan, Saxon, Microsoft MSXML, James Clark XT, or any other appropriate translator. Format Converter 140 converts the XSL FO 135 document to a document in a specified format. In one embodiment of the present invention, a new document format is portable document format (PDF). In another embodiment of the present invention a specified document format is a document in any markup language.

Figure 4:
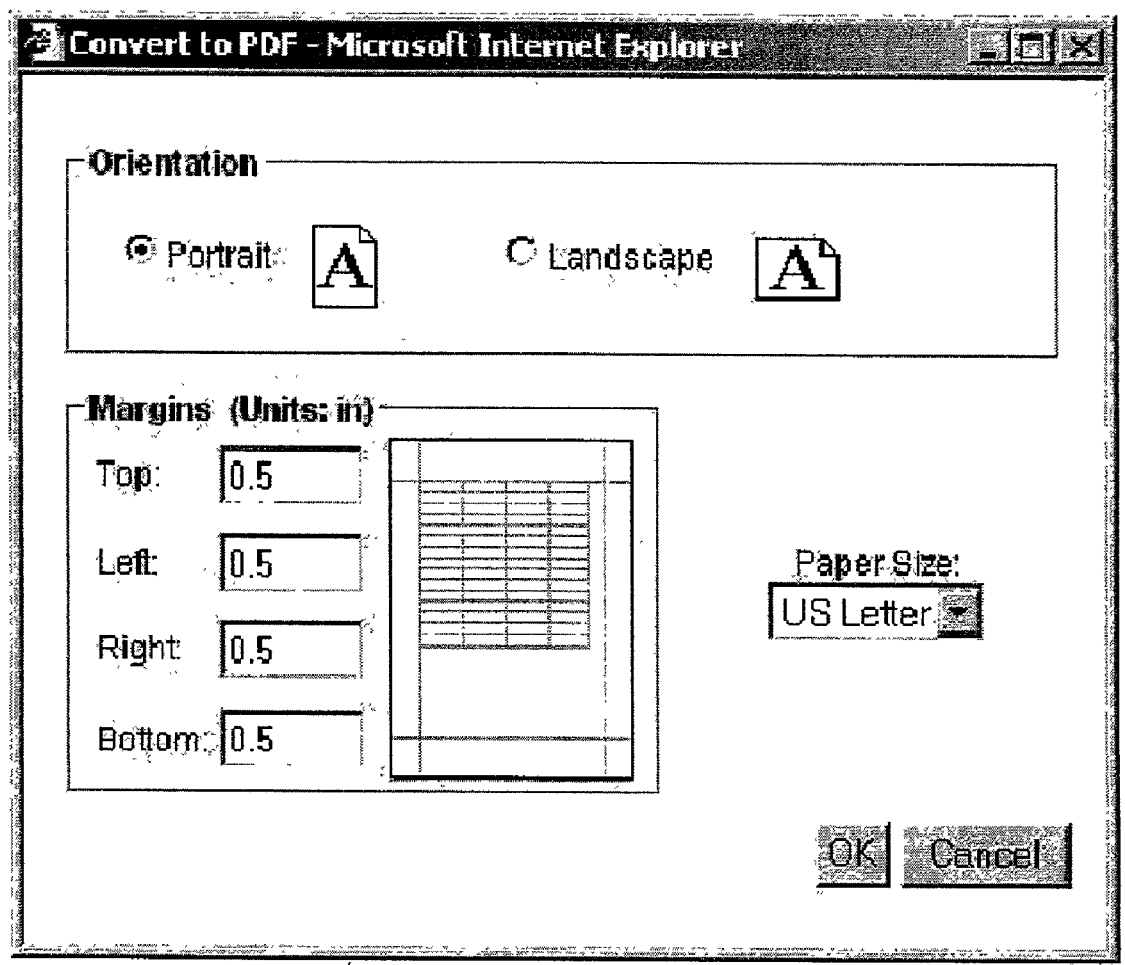
FIG. 4 illustrates a graphic user interface (GUI) in accordance with one described embodiment of the present invention.

Referring now to FIG. 4, there is shown a graphic user interface (GUI) 310 in accordance with a described embodiment of the present invention. GUI 310 shown in FIG. 4 shows the following properties: Page Orientation, Paper Size, and Margins. Page Orientation could be one of 'Portrait' and 'Landscape'. Page orientation generates two XML tags: Height and Width. Paper Size generates three XML tags: Height, Width, and Master Name. Master Name can be 'US Letter,' 'A4,' or any other format. The value of Height and Width varies depending on whether the orientation chosen is Portrait or Landscape. For example, if a user chooses a Portrait orientation, Paper Size will generate the following XML tags: Width=8.5 and Height=11. In contrast, if the user chooses a Landscape orientation, Width=11 and Height=8.5. These tags are imported into XSL file 200 using <xsl:import>.

GUI 310 also shows four margins: Top, Bottom, Left, and Right. Each of the four margins generates one XML tag. Default settings in GUI 310 are 'margin_top'=0.5 inches, 'margin_bottom'=0.5 inches, 'margin_left'=0.5 inches, and 'margin_right'=0.5 inches (not shown). XSL file 200 imports these settings using <xs:import>. In accordance with the present invention a user can modify default settings in GUI 310 so that 'margin_left'=1 inch, 'margin_right'=2 inches, and 'margin_bottom'=3 inches, instead of default settings 'margin_left'=0.5 inches, 'margin_right'=0.5 inches, and 'margin_bottom'=0.5 inches, which represent imported rules. The new rules will be added to the XSL file 200 and will override the imported rules (default settings) by manipulating the XSL file's 200 memory representation, XML/XSL DOM 130.

Figure 5:
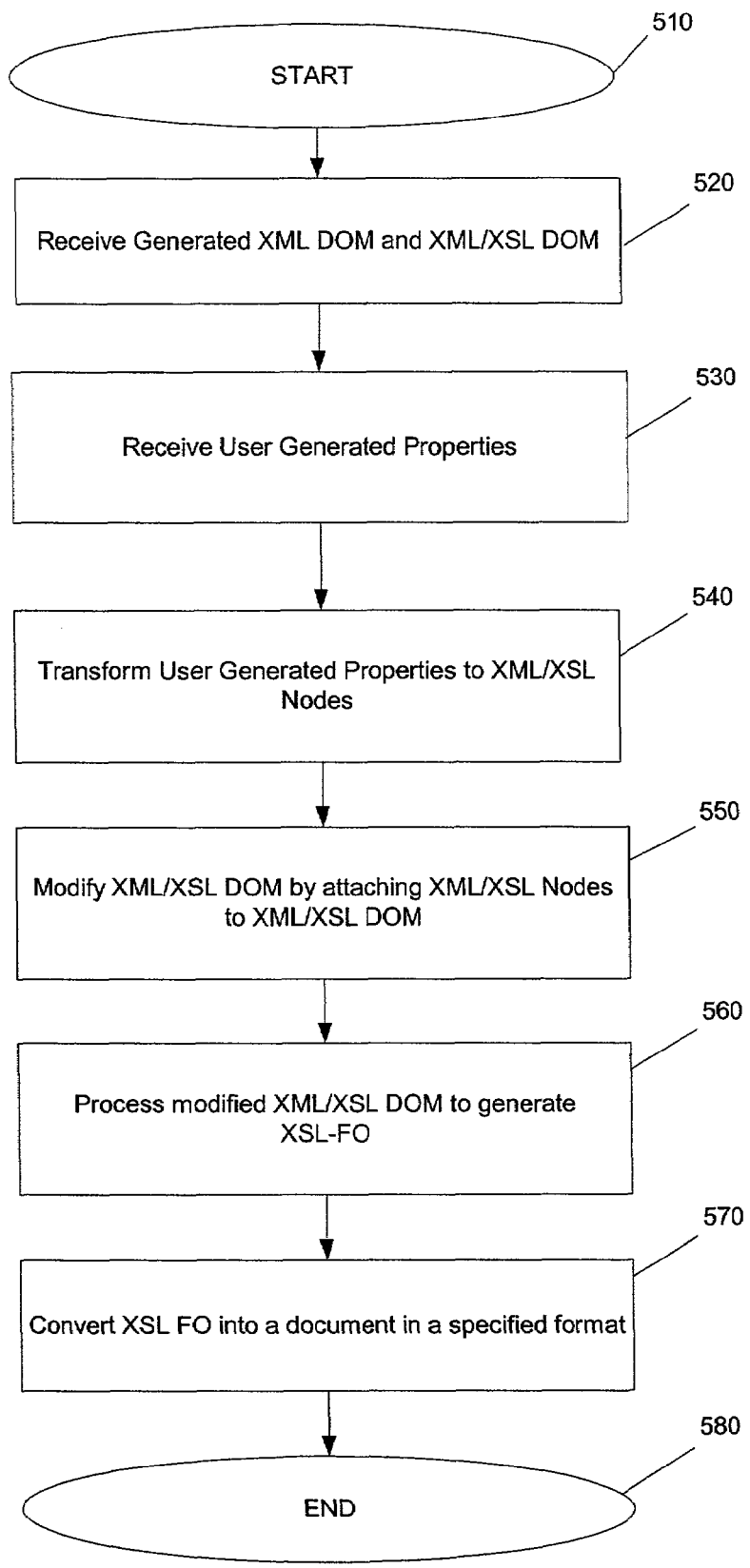
FIG. 5 is a flow chart of a process for dynamically generating the rules for XML transformations performed by the embodiment of FIG. 3.
Figure 7:
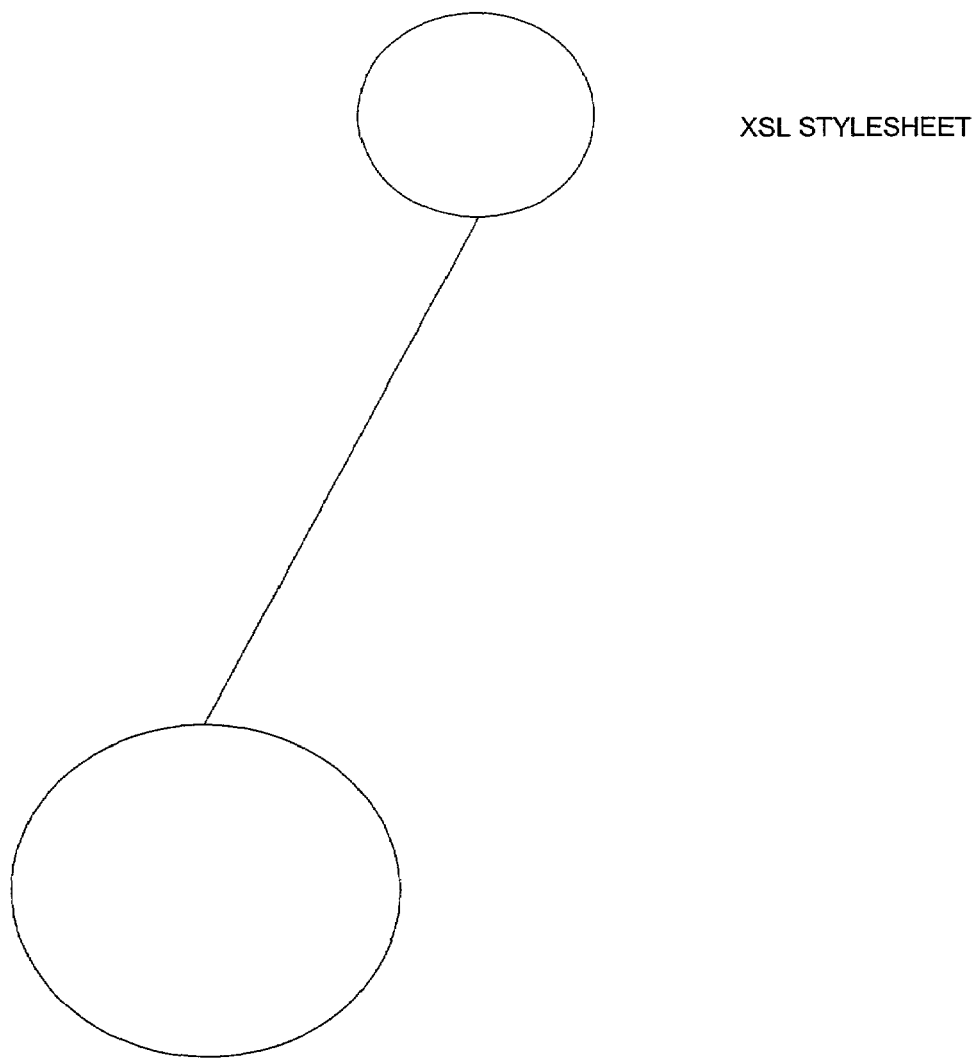
FIG. 7 illustrates XML/XSL DOM 130 before applying dynamically generated rules.

FIG. 5 is a flow chart of a process for dynamically generating rules for XML transformation. The process starts 510 and receives 520 XML DOM 110, which is a representation of an XML document in memory. The process also receives XML/XSL DOM 130, which is a representation of an XSL document in memory. FIG. 7 shows a node structure of XML/XSL DOM 130. FIG. 7 shows one node representing the rules with the following imported variables Name=Margin_Top=0.5 inches;

Name=Margin_Left=0.5 inches; Name=Margin_Right=0.5 inches;

Name=Margin_Bottom=0.5 inches.

Once a user effects the changes on the screen of GUI 310 and pushes the 'OK' button, receiving module 320 receives 530 user-generated properties in the form of key-value pairs. In the example of FIG. 4, key-value pairs are 'margin_left'=1 and 'margin_right'=2 inches, and 'margin_bottom'=3 inches. Transformation module 330 transforms 540 user-generated properties into XML/XSL nodes in memory. Modification module 340 modifies 550 XML/XSL DOM by attaching on the fly these XML/XSL nodes (one node per one variable) to generate modified XML/XSL DOM 325.

Figure 8:
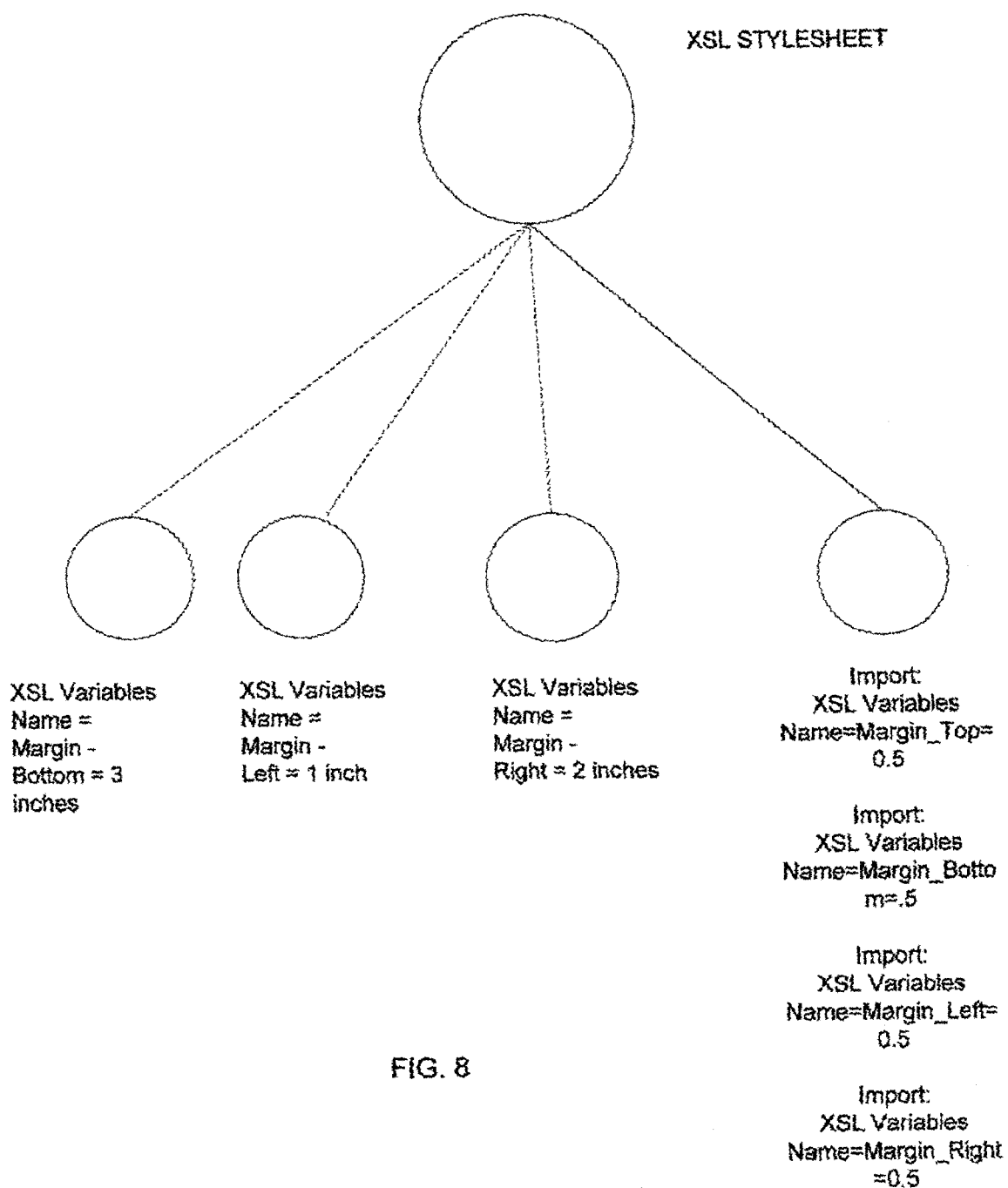
FIG. 8 illustrates a modified XML/XSL DOM 325 in memory in accordance with one embodiment of the present invention.

Referring now to FIG. 8, it illustrates the modified XML/XSL DOM 325 in memory after applying dynamically generated rules in one embodiment of the present invention. The node structure comprises one XSL node having an XML tag, each tag representing the imported rules with the following imported variables:

Name=Margin_Top=0.5 inches; Import: Name=Margin_Left=0.5 inches;

Name=Margin_Right=0.5 inches; Name=Margin_Bottom=0.5 inches. The node structure 325 further comprises three XSL nodes representing XSL rules with the following dynamic variables: Variables Name='margin_left'=1 inch, XSL Variables Name='margin_right'=2 inches, and 'XSL Variables Name='margin_bottom'=3 inches.

XSLT processor 120 receives 560 modified XML/XSL DOM 325, from Modification module 340. Since dynamically generated rules added to the containing XSL file 200 have a higher priority than imported XSL rules used for the default rules, XSLT processor 120 overrides the imported rules with the dynamically generated ones and processes modified XML/XSL DOM 325 to generate XSL-FO 135. XSL-FO is a format in which any document can be represented in XML. XSL-FO can represent any document, such as a newsletter, a book, etc. Thus, the new rules created "on the fly" override the imported default rules with variables: 'margin_bottom'=0.5 inches, 'margin_left'=0.5, and margin_right'=0.5 respectively. In 570, XSL-FO is converted into a document in a specified format, such as a PDF or any mark-up language and the process ends in 580.

Figure 6:
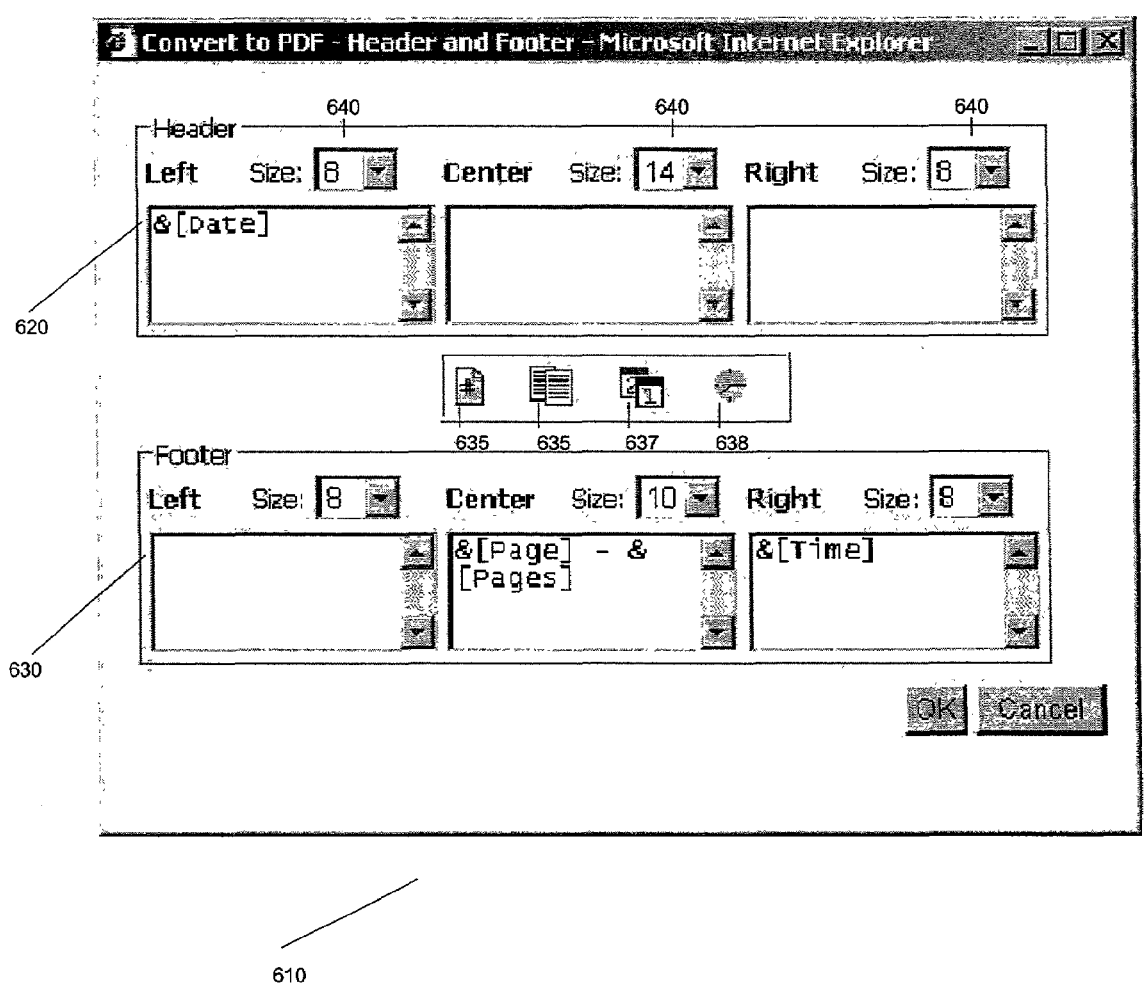
FIG. 6 illustrates a graphic user interface with advanced options in accordance with another embodiment of the present invention.

Referring to FIG. 6, there is shown GUI 610 with the following properties: Page Number 635, Total Number of Pages 636, Date 637, and Time 638. The following table features these properties and the tags they generate.

| UI | XSL-FO tag |
|---|---|
| &[Date] | <xsl:variable<br>    name="date"><br>    <xsl:value-of<br>        select=<br>            'java:com.alphablox.xsl.<br>                extensions.Today.getDate( )' /><br></xsl:variable> |
| &[Time] | <xsl:variable<br>    name="date"><br>    <xsl:value-of |

-continued

| UI | XSL-FO tag |
|---|---|
| | select= 'java:com.alphablox.xsl. extensions.Today.getTime( )' /> </xsl:variable> |
| &[Logo] | <fo:external-graphic text-align="{$align}" width="auto" height="auto"> <xsl:attribute name="src"> <xsl:value-of select="$logo"/> </xsl:attribute> </fo:external-graphic> |
| &[Page] | <fo:page-number/> |
| &[Pages] | <fo:page-number-citation ref-id="end-of-content"/> |

The advanced dialog of FIG. 6 allows a user to customize a header 620 and footer 630 so that the user can generate a report 'on the fly'. It should be noted that XSL file 200 imports default rules specifying where text should be displayed in the header 620 and footer 630 of GUI 610. The user can generate a report and edit it 'on the fly' by choosing a region (Left, Center, and Right) where the text will be displayed in the header 620 and footer 630. Thus, the user may specify that the Page Number 635 and the Total Number of Pages 636 be shown in the Center region of the footer 630. In addition, the user may indicate that Date 637 and Time 638 be shown in the Left region of the header 620. The user can also modify the font size of the text by selecting a choice from a drop-down menu in Size box 640. Once the user effects the changes, new XML declarations will be added to the containing XSL file 200 by manipulating its memory representation. The new dynamically created rules will override the imported rules representing default settings.

As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims and equivalents.

What is claimed is:

1. A method for dynamically generating rules for extended stylesheet language (XSL) transformations, wherein an extensible markup language (XML) document object model (DOM) represents an XML document, and an XML/XSL DOM represents an XSL file, said XML/XSL DOM comprising one or more nodes that contain an XSL rule describing how XML data should be transformed, wherein at least one of said nodes contains an imported default XSL rule describing how XML data should be transformed with an imported variable, the method comprising:
receiving a user generated property having a form of a key-value pair;
transforming the user generated property to an XML/XSL node, the XML/XSL node containing a dynamically generated XSL rule of XML data transformation with a dynamic variable based on said user generated property having the form of the key-value pair;
modifying the XML/XSL DOM by attaching the XML/XSL node containing said dynamically generated XSL rule with the dynamic variable based on said user generated property to said XML/XSL DOM, wherein the XML/XSL node containing said dynamically generated XSL rule with the dynamic variable based on said user generated property has a higher priority than any node of the XML/XSL DOM that contains the imported default XSL rule with the imported variable for that property; and
applying said modified XML/XSL DOM to said XML DOM to produce an XSL formatted object.

2. The method of claim 1, further comprising:
converting said XSL formatted object to a specified data format.

3. The method of claim 2, wherein the specified data format is portable document format.

4. The method of claim 2, wherein the specified data format is a markup language.

5. The method of claim 1, wherein said one or more nodes of said XML/XSL DOM representing said XSL file contain imported XSL rules.

6. The method of claim 1, wherein the user generated property is a page orientation.

7. The method of claim 6, wherein the page orientation is associated with a width and a height, and said dynamically generated XSL rule comprises a width tag associated with said width, and another dynamically generated XSL rule comprises a height tag associated with said height.

8. The method of claim 1, wherein the user generated property is a margin.

9. The method of claim 8, wherein said dynamically generated XSL rule for said margin comprises one tag.

10. The method of claim 1, wherein the user generated property is a paper size.

11. The method of claim 10, wherein the paper size is associated with a height, width and master name, and said dynamically generated XSL rule comprises a tag associated with said height, and another dynamically generated XSL rule comprises another tag associated with said width, and yet another dynamically generated XSL rule comprises yet another tag associated with said master name.

12. The method of claim 1, wherein the user generated property is a date.

13. The method of claim 1, wherein the user generated property is a time.

14. The method of claim 1, wherein the user generated property is a company logo.

15. The method of claim 1, wherein the user generated property is a page number.

16. The method of claim 1, wherein the user generated property is a total number of pages.

17. The method of claim 1 further comprising:
displaying a graphical user interface to allow a user to enter said user generated property.

18. The method of claim 17, further comprising converting said SL formatted object to a specified data format.

19. The method of claim 17, wherein said nodes of said ML/SL DOM representing said SL file contain imported SL rules.

20. A system for dynamically generating rules for extended stylesheet language (XSL) transformations, wherein an extensible markup language (XML) document object model (DOM) represents an XML document, and an XML/XSL DOM represents an XSL file, said XML/XSL DOM comprising one or more nodes that contain an XSL rule describing how XML data should be transformed, wherein at least one of said nodes contains an imported default XSL rule describing how XML data should be transformed with an imported variable, the system comprising:

a module for receiving a user generated property having a form of a key-value pair;

a module for transforming the user generated property to an XML/XSL node, the XML/XSL node containing a dynamically generated XSL rule of XML data transformation with a dynamic variable based on said user generated property having the form of said key-value pair;

a module for modifying the XML/XSL DOM by attaching the XML/XSL node containing said dynamically generated XSL rule with the dynamic variable based on said user generated property to said XML/XSL DOM, wherein the XML/XSL node containing said dynamically generated XSL rule with the dynamic variable based on said user generated property has a higher priority than any node of the XML/XSL DOM that contains the imported default XSL rule with the imported variable for that property; and a module for applying said modified XML/XSL DOM to said XML DOM to produce an XSL formatted object.

21. The system of claim 20, further comprising a module for converting said XSL formatted object to a specified data format.

22. The system of claim 21, wherein the specified data format is portable document format.

23. The system of claim 21, wherein the specified data format is a markup language.

24. The system of claim 20, wherein said nodes of said XML/XSL DOM representing said XSL file contain imported XSL rules.

25. The system of claim 20, wherein the user generated property is a page orientation.

26. The system of claim 25, wherein the page orientation is associated with a width and a height, and said dynamically generated XSL rule comprises a width tag associated with said width, and another dynamically generated XSL rule comprises a height tag associated with said height.

27. The system of claim 20, wherein the user generated property is a margin.

28. The system of claim 27, wherein said dynamically generated XSL rule for said margin comprises one tag.

29. The system of claim 20, wherein the user generated property is a paper size.

30. The system of claim 29, wherein the paper size is associated with a height, width and master name, and said dynamically generated XSL rule comprises a tag associated with said height, and another dynamically generated XSL rule comprises another tag associated with said width, and yet another generated XSL rule comprises yet another tag associated with said master name.

31. The system of claim 20, wherein the user generated property is a date.

32. The system of claim 20, wherein the user generated property is a time.

33. The system of claim 20, wherein the user generated property is a company logo.

34. The system of claim 20, wherein the user generated property is a page number.

35. The system of claim 20, wherein the user generated property is a total number of pages.

36. A computer program product for dynamically generating rules for extended stylesheet language (XSL) transformations, wherein an extensible markup language (XML) document object model (DOM) represents an XML document, and an XML/XSL DOM represents an XSL file, said XML/XSL DOM comprising one or more nodes that contain an XSL rule describing how XML data should be transformed, wherein at least one of said nodes contains an imported default XSL rule describing how XML data should be transformed with an imported variable, the computer program product comprising:

a computer readable medium;

a module stored on the medium for receiving a user generated property having a form of a key-value pair;

a module stored on the medium for transforming the user generated property to an XML/XSL node, the XML/XSL node containing a dynamically generated XSL rule of XML data transformation with a dynamic variable based on said user generated property having the form of said key-value pair;

a module stored on the medium for modifying the XML/XSL DOM by attaching the XML/XSL node containing said dynamically generated XSL rule with the dynamic variable based on said user generated property to said XML/XSL DOM, wherein the XML/XSL node containing said dynamically generated XSL rule with the dynamic variable has a higher priority than any node of the XML/XSL DOM that contains the imported default XSL rule with the imported variable for that property; and a module stored on the medium for applying said modified XML/XSL DOM to said XML DOM to produce an XSL formatted object.

37. The computer program product of claim 36, further comprising a module stored on the computer readable medium for converting said XSL formatted object to a specified data format.

38. A method for dynamically generating rules for stylesheet language (SL) transformations, wherein a markup language (ML) document object model (DOM) represents a ML document, and a ML/SL DOM represents a SL file, said ML/SL DOM comprising one or more nodes that contain an SL rule describing how ML data should be transformed, wherein at least one of said nodes contains an imported default SL rule describing how ML data should be transformed with an imported variable the method comprising:

receiving a user generated property having a form of a key-value pair;

transforming the user generated property to a ML/SL node, the ML/SL node containing a dynamically generated SL rule of ML data transformation with a dynamic variable based on said user generated property having the form of said key-value pair;

modifying the ML/SL DOM by attaching the ML/SL node containing said dynamically generated SL rule of ML data transformation with the dynamic variable based on said user generated property to said ML/SL DOM, wherein the ML/SL node containing said dynamically generated SL rule of data transformation with the dynamic variable based on said user generated property has a higher priority than any node of the ML/SL DOM that contains the imported default SL rule describing how ML data should be transformed with the imported variable for that property;

applying said modified ML/SL DOM to said ML DOM to produce an SL formatted object.

39. A computer program product for dynamically generating rules for stylesheet language (SL) transformations, wherein a markup language (ML)/SL document object model (DOM) represents an SL file, said ML/SL DOM comprising one or more nodes that contain an SL rule describing how ML data should be transformed, wherein at least one of said nodes contains an imported default SL rule describing how ML data should be transformed with an imported variable, and an ML DOM represents a ML document, the product comprising:
- a computer readable medium;
- a module stored on the medium for receiving a user generated property having a form of a key-value pair;
- a module stored on the medium for transforming the user generated property to a ML/SL node, the ML/SL node containing a dynamically generated SL rule of ML data transformation with a dynamic variable based on said user generated property having the form of the key-value pair;
- a module stored on the medium for modifying the ML/SL DOM by attaching the ML/SL node containing said dynamically generated SL rule with the dynamic variable based on said user generated property to said ML/SL DOM, wherein the ML/SL node containing said dynamically generated XL rule with the dynamic variable based on said user generated property has a higher priority than any node of the ML/SL DOM that contains the imported default SL rule with the imported variable for that property; and
- a module stored on the computer readable medium for applying said modified ML/SL DOM to said ML DOM to produce an XL formatted object.

40. The computer program product of claim 39 further comprising a module stored on the computer readable medium for converting said SL formatted object to a specified data format.

41. The computer program product of claim 39, wherein said nodes of said ML/SL DOM representing said SL file contain imported XSL rules.

* * * * *